2,776,301

OXIDATION WITH PEROXIDES

George B. Payne and Curtis W. Smith, Berkeley, Calif., assignors to Shell Development Company, New York, N. Y., a corporation of Delaware No Drawing. Application August 17, 1954,
Serial No. 450,551

13 Claims. (Cl. 260—348.5)

This invention relates to reactions of organic compounds with organic or inorganic peroxides to increase their oxygen content. It deals with an improved process for carrying out the controlled partial oxidation of organic compounds with peroxides whereby the yield of valuable products, based on the peroxide consumed, can be increased.

Peroxides are known to be effective for the partial oxidation of a variety of organic compounds. They are especially useful in epoxidizing and hydroxylating ethylenic compounds, for example. Only limited use has been made of peroxides in commercial scale synthesis of this kind, however. Many reactions which appear promising on the basis of laboratory experiments have proved to be uneconomical when carried out in the plant. One contributing factor has been the increased consumption of peroxide which frequently accompanies the use of peroxide in technical scale operations. An important object of the present invention is to overcome this disadvantage of prior methods of carrying out partial oxidations of organic compounds with peroxide oxidizing agents.

It is an object of the present invention to provide a process for oxidizing organic compounds which gives high yields of partial oxidation products based upon the amount of peroxide oxidizing agent used. Another object is the provision of a process for oxidizing organic compounds with peroxides employing two cooperating treating steps in series whereby more effective use of the peroxide can be achieved. A special object is the efficient epoxidation and/or hydroxylation of ethylenic compounds by means of peroxides. Still other objects and advantages of the new method will be apparent from the following description of the invention.

These objects are accomplished according to the invention by carrying out the oxidation of organic compounds with peroxides in a two-step process in which the organic compound to be oxidized or the reaction medium in which the oxidation is to be conducted, or preferably both, are first intimately contacted with an adsorptive solid having more than 30% porosity on a void-free basis and, after separation of the solid, the oxidation of the organic compound with the peroxide is carried out under conditions at which partial oxidation is effected. By this method of operation it has been found, unexpectedly, that higher conversions of peroxide to valuable partial oxidation products can be obtained with technical feed stocks than are possible under similar circumstances without the use of the pretreating step of the new process.

The exact function of the pretreatment with adsorptive solid has not been fully elucidated. It seems possible that the adsorptive solid serves to remove from the feed stocks to the process some material or materials which interfere with the desired reaction of the peroxide. Analysis indicates that metallic ions, particularly of iron probably present from the equipment, are removed by the pretreatment and this may contribute to the improved results which have been obtained. Whatever the explanation, it has been found that the treatment of one or more of the feed components with an adsorptive solid, particularly alumina, under conditions at which any heavy metal ions present are adsorbed by the solid prior to oxidation with a peroxide, results in a more efficient production of desired oxidation products.

The feed component or mixture thereof being treated can be contacted with the adsorptive solid in any suitable manner. One method which is particularly convenient for batchwise operation comprises stirring an effective amount of the adsorptive solid in finely divided form with the material which is being treated in the liquid state to insure intimate contact for the required period of time, then separating the solid from the treated liquid by settling, filtration or the like. The separated adsorptive solid can usually be reused for treatment of subsequent batches in the same way, but it is frequently desirable to remove adsorbed organic material which collects on the solid before reusing it for further pretreatment. Such adsorbed organic material appears to prevent the necessary intimate contact between the adsorptive solid and the organic feed stock undergoing treatment. This intimate contact is necessary in order for the treatment to be effective. Extraction with a solvent for the organic compound or compounds being treated is usually suitable in making the adsorptive solid effective for reuse, and by periodic washing with such a solvent the adsorptive solid has a very long ultimate life in the process. The thus extracted organic material can be recovered from the solvent and added to the feed to the process as it has been found not to be detrimental in the oxidation reaction. In this way even this small loss of feed material can be avoided and usually 96%–99% of the feed stock is recovered from the pretreatment step of the process.

The adsorptive solids which are used in the first step of the process are, as previously pointed out, those which have a porosity greater than 30% on a void-free basis. The porosity, as used herein, relates to interstices or pores of a diameter less than 0.03 millimeter. The adsorptive solids which have been found effective for the pretreatment are thus those which have more than 30% porosity attributable to pores of less than 0.030 millimeter in diameter. The preferred adsorptive solids are those having a porosity between about 45% and about 70%, and most preferably have an average pore diameter of 20 to about 200 Angstrom units. It is also desirable that adsorptive solid used have a surface area of at least 10 square meters per gram, and more preferably from about 50 to 2000 square meters per gram. A number of adsorptive solids meeting these requirements are available. Especially good results have been obtained with adsorptive aluminas. Suitable forms of adsorptive alumina are, for instance, those sold by the Aluminum Company of America as Alorco F–1, F–2, F–11 and F–20 grades of alumina and Harshaw alumina grades A, Al–0104 and Al–0501.

Instead of the adsorptive aluminas, one can use other adsorptive oxides, particularly gels such, for example, as silica gels, magnesia gels and zirconia gels, or mixtures of such oxide gels. For instance, alumina-silica gel mixtures containing about 5% silica and having a surface area of about 450 square meters per gram, or the silica-magnesia or silica-zirconia gel cracking catalysts can be used. Silica zero gels which can be of either the wide pore (about 90 Angstrom units) or the narrow pore (about 20 Angstrom units) type can likewise be employed.

Adsorptive clays, particularly the montmorillonite clays which are used in decolorizing lubricating oils, are another type of adsorptive solid which can be employed in the first step of the present process. Geological Survey Bulletin 928C describes adsorptive clays which are thus useful.

Activated carbon is another form of adsorptive solid which has been found to be suitable for use in the pretreating step. The commercial forms of activated charcoal known at Norit and Darco are particularly suitable for this purpose. One can, however, use other forms of carbon produced by destructive distillation of vegetable or animal matter. Those activated by treatment with air, steam or carbon dioxide at elevated temperatures are preferred. Animal charcoals such as those obtained from bones are another source of adsorptive solid material.

The chosen adsorptive solid should preferably be as free as possible of foreign metallic elements. To this end it may be desirable to treat the adsorptive solid with acid or other suitable agent for removing such impurities before using it in the process, and it has generally been found to be advantageous to thoroughly wash the adsorptive solid with water and/or any solvent used with the organic compound being treated before employing the adsorptive solid for pretreating according to the invention.

It has been found best to use the adsorptive solid in granular form, preferably as particles of 20 mesh or less, most preferably about 40 to about 250 mesh size.

The amount of adsorptive solid used for the pretreatment can vary widely. When using adsorptive alumina of about 20 to about 100 mesh size, it is preferred to employ about 10 to about 20 parts by weight per 100 parts of the material being treated therewith. Other adsorptive solids can be used advantageously in equivalent amounts. The treatment can be effectively carried out at ordinary temperatures and pressure, but higher or lower temperatures and pressures can be used if desirable. However, the conditions of treatment should be so chosen that substantially no conversion of the organic compound which is to be oxidized takes place in this step of the process. Generally, about 10 to about 20 minutes' contact between the adsorptive solid and the liquid which is being treated is sufficient. As a rule, the most efficient treatment period can be determined by testing the liquid undergoing treatment periodically for iron and discontinuing the treatment when the test is negative or substantially negative.

It is most desirable to carry out the pretreatment of organic compounds with a solution of the organic compound in a polar solvent as this has been found to facilitate the attainment of the desired result. In fact, as a rule, superior results are obtained in this way, aqueous solvents being especially effective. Where the compound being treated is not soluble in such slovents, it can often be made so by employing a mutual solvent. Aqueous alcohol solutions of the organic compound being oxidized are generally treated most efficiently with the adsorptive solid in such media.

For continuous operation the adsorptive solid can be employed in the form of beds through which the liquid being treated can be passed at the rate required to give the desired period of intimate contact. The liquid is preferably flowed upward through a bed of adsorptive solid of about 20 to 40 mesh size which provides adequate contact surface without excessive pressure drop. However, the liquid being treated can be percolated downward through the bed of adsorptive solid, or horizontal flow can be employed. It is advantageous to operate with a plurality of beds of adsorptive solid through which the liquid can be passed in series with an extra bed available for regeneration by solvent washing as previously described. In this way, by switching the flow between the various beds, the regeneration can be carried out without interrupting the treatment. With such an arrangement one can operate in a countercurrent manner so that the incoming feed for treatment first contacts the bed which has been longest in the treating cycle, while the last stage of the treatment is carried out with the bed of adsorptive solid which has been most recently regenerated. With this periodic solvent washing, the adsorptive solid has been found to have a very long effective life which can be still further extended by acid treatment at suitable intervals followed by water washing to remove acid from the adsorptive material. Hydrochloric, sulfuric and nitric acids are typical of the strong inorganic acids which can be used, preferably as aqueous solutions of about 2% to 25% concentration.

As previously pointed out, either the organic compound to be oxidized or the liquid solvent or diluent, if any, in which the oxidation is carried out, or both, can advantageously be given the treatment with adsorptive solid. The treatment is useful with both aqueous and non-aqueous solvents and diluents. Thus, when carrying out oxidations, particularly hydroxylations, with peroxide oxidizing agents using water as the reaction medium, it may be desirable to apply the treatment to the water employed as the solvent as well as, or instead of, to the organic compound being oxidized. Where the organic compound is soluble in the reaction medium and both are to be given the treatment with adsorptive solid, it is usually advantageous to carry out the treatment of both of these components of the reaction medium simultaneously by contacting a solution of the organic reactant in the reaction medium with the adsorptive solid as described hereinbefore. When these components are incompletely miscible with each other, it is often preferable to treat them separately with adsorptive solid, but this is not essential.

The oxidation step of the process using the treated feed material can be carried out in any suitable manner. A variety of methods of oxidizing organic compounds are known. The process has been found to be especially advantageous in carrying out the addition of oxygen to unsaturated organic compounds, particularly in the production of epoxides and/or polyols from the corresponding ethylenic compounds. In such methods of oxidation relatively mild reaction conditions are used and the reactions can be carried out in either the presence or absence of any of the usual organic or inorganic catalysts which are known to promote these reactions. An especially advantageous method of catalytic hydroxylation of ethylenic compounds is described in copending application Serial No. 284,833, filed April 28, 1952, while copending application Serial No. 360,357, filed June 8, 1953, describes a method of oxidizing ethylenic compounds to produce oxirane compounds, which method can advantageously be employed in connection with the present process. Another method of carrying out these and other types of oxidation reactions, to which the present process can be usefully applied, are described in Bergsteinsson Patent U. S. 2,373,942, for example. Still other methods of oxidation with peroxides which may or may not involve reaction under more drastic conditions can also be used.

The new process has been found to be especially advantageous for the oxidation of polar organic compounds, particularly unsaturated organic halides and acids, including unsaturated carboxylic and sulfonic acids and the like. The improvement in yield, based upon the amount of peroxide used, is generally particularly marked in such cases, especially in the case of the more high boiling compounds of these types which tend to be somewhat corrosive. Notable improvements can also be obtained in the oxidation of other types of organic compounds, the greatest advantage being usually obtained, however, when at least one component of the reaction mixture, other than the peroxide employed, is at least as corrosive as water.

Improvements are obtained when any type of peroxide oxidizing agent is used in the oxidation step. Hydrogen peroxide is an especially effective peroxide which can be employed in the new process to effect a number of different kinds of oxidation reactions. It can be used in anhydrous form or as an aqueous solution. Particularly useful are the commercially available aqueous solutions of about 25% to about 60% concentration. Solutions of hydrogen peroxide in organic solvents, for instance, alcohols, hydroxy ethers, ketones, and the like, can be employed. Instead of using hydrogen peroxide, one can use compounds which generate hydrogen peroxide under the reaction conditions. Other inorganic peroxides and particularly the organic peroxides are useful oxidizing agents in the new process. Considerable savings have been achieved when using such organic peroxides as performic and peracetic acids, perbenzoic acid, tertiary butyl hydroperoxide and benzoyl peroxide, for instance. Peroxide mixtures such as are obtained by partial oxidation of hydrocarbons, as described in U. S. Patent 2,376,257, are another type of useful oxidizing agent in the process of the invention. For epoxidation of ethylenic compounds, peracids are a particularly useful type of peroxide which is advantageously used in solution in an excess of the corresponding carboxylic acid and can be either separately prepared or can be formed in situ in the oxidation mixture by reacting the carboxylic acid with a suitable oxidizing agent, for instance, a perchlorate, or permanganate, or sodium or hydrogen peroxide, etc.

The following examples showing application of the new process to the treatment of ethylenic compounds having 3 to 18 carbon atoms per molecule further illustrate the invention and show some of the advantages which it provides:

Example I

The insecticide "Dieldrin" (1,2,3,4,10,10-hexachloro-6,7-epoxy- 1,4,4a,5,6,7,8,8a- octahydro- 1,4,5,8- endo- exo-dimethanonaphthalene) was produced by epoxidizing the corresponding hexachlorocyclic olefin "Aldrin" (1,2,3,4,10,10-hexachloro-1,4,4a,5,8,8a-hexahydro-1,4,5,8-endo-exo-dimethanonaphthalene). One hundred parts of the crude commercial Aldrin of 83% purity were dissolved by warming to 50° C. in 350 parts by weight of tertiary butyl alcohol-water azeotrope containing 88.2% of tertiary butyl alcohol. The solution was filtered through a thin layer of filter-aid and passed through a column of 20–40 mesh Alorco "F–1" adsorptive alumina at a flow rate of 8 bed-volumes per hour. After all the Aldrin solution had been thus alumina-treated, the column was washed with 1⅓ bed-volumes of tertiary butyl alcohol-water azeotrope, and the eluate was added to the treated Aldrin solution. The resulting solution was fed to a mechanically stirred reactor equipped with a condenser. Four percent of tungstic acid catalyst, based on the weight of the starting Aldrin, was added, and the mixture warmed to 70° C. with stirring while 1.52 moles of hydrogen peroxide per mole of Aldrin present were run into the reactor. The reaction mixture was maintained at 70° C. for six hours and was then gently refluxed at 81° C. for two additional hours. Peroxide consumption was 1.23 moles per mole of starting Aldrin. The reaction mixture was run into somewhat more than twice its volume of a 0.3% aqueous solution of potassium carbonate to precipitate the crude Dieldrin which was recovered by filtration, water-washed and dried under vacuum to obtain a 96% yield of Dieldrin, based on an 86% conversion of the starting Aldrin. The yield of Dieldrin was 68% based on the hydrogen peroxide converted in the reaction.

Reaction under identical conditions with Aldrin which had not been given the alumina pretreatment resulted in a yield of Dieldrin of only about 60% based on the Aldrin charged, and 40% based on the hydrogen peroxide converted.

Example II

Using the same method of operation as described in Example I, commercial "Isodrin" (1,2,3,4,10,10-hexachloro-1,4,4a,5,8,8a-hexahydro-1,4,5,6- endo-endo-dimethanonaphthalene) was treated with adsorptive alumina and epoxidized with hydrogen peroxide in the presence of tungstic acid as catalyst to produce "Endrin" (1,2,3,4,10,10-hexachloro-6,7-epoxy-1,4,4a,5,6,7,8,8a-octahydro- 1,4,5,6- endo- endo-dimethanonaphthalene) in a yield of 80%, based on the Isodrin charged, and 67%, based on the hydrogen peroxide consumed in the reaction.

When the same Isodrin was epoxidized in the same way without the alumina pretreatment, the yield of Endrin was only about 45%, based on the Isodrin charged, and 30%, based on the hydrogen peroxide consumed in the reaction.

Example III

Commercial Aldrin of the same purity as that used in Example I was epoxidized by reaction in benzene solution of 10% concentration with 45% peracetic acid. After reaction for 6 hours at 50° C., the reaction mixture was diluted with water and the Dieldrin produced was recovered from the separated benzene layer by distillation. With aldrin which had been pretreated with alumina as in Example I, the yield of Dieldrin was 100 mole percent based upon the Aldrin reacted, whereas the unpretreated technical Aldrin gave a yield of only 68 mole percent on the same basis. The conversion of hydrogen peroxide to Dieldrin was 50% at 72% total conversion with the pretreated Aldrin, compared with only 34% at 94% total hydrogen peroxide conversion with the unpretreated Aldrin.

Example IV

In the epoxidation of technical oleic acid by reaction with preformed peracetic acid in acetic acid solution of 13% concentration, using 1.2 moles of the peracid per mole of unsaturated acid at 35° C. for 3 hours, the yield of epoxide was correspondingly increased by pretreating an alcoholic solution of the oleic acid with about 1 part by weight of adsorptive alumina per part of acid at room temperature for about 10 minutes prior to epoxidation, compared to direct epoxidation.

Example V

Allyl alcohol which had been prepared by hydrogenating acrolein using a copper-containing catalyst was hydroxylated by reacting a 14.61% aqueous solution of the alcohol with a 4% solution of hydrogen peroxide in a mole ratio of 2.0:1 in the presence of 5.98% by weight of $H_2WO_4$ catalyst, based on the allyl alcohol present, using a temperature of 50°–70° C. and a residence time of 3 hours 16 minutes. By pretreatment of the allyl alcohol feed by passage through a column of Norit A activated charcoal at the rate of about 6 bed-volumes per hour, an 89.14% conversion of hydrogen peroxide to glycerol was obtained, compared with a conversion of only about 79.2% without pretreatment of the crude allyl alcohol.

A similar improvement in yield of glycerol is obtained when the process is carried out using osmium tetroxide-catalyzed hydroxylation as the second step.

It will thus be seen that the process of the invention offers many advantages over prior methods of oxidizing organic compounds with peroxides, especially in respect to the improved production of valuable oxidation products which can be obtained from a given amount of such oxidizing agent. The invention is widely applicable and capable of considerable variation. It is not intended to be limited to the examples which have been given by way of illustration, nor by any theory proposed in explanation of the improved results which are obtained.

We claim as our invention:

1. In a process of oxidizing an ethylenic compound of 3 to 18 carbon atoms per molecule having not more than two ethylenic double bonds in the molecule by reaction in the liquid phase with a peroxide oxidizing agent of the group consisting of hydrogen peroxide and peroxycarboxylic acids to form a product of the group consisting of epoxidation and hydroxylation products, the improvement which comprises intimately contacting said ethylenic compound with an adsorptive solid of the group consisting of adsorptive alumina, silica gel, magnesia gel, zirconia gel, adsorptive clay, activated carbon and animal charcoal having more than 30% porosity on a void-free basis attributable to pores of less than 0.030 millimeter in diameter, prior to mixing said ethylenic compound with said peroxide oxidizing agent to effect said oxidation.

2. In a process of oxidizing an ethylenic compound of 3 to 18 carbon atoms having not more than two ethylenic double bonds per molecule to form a product of the group consisting of epoxidation and hydroxylation products by liquid phase reaction with hydrogen peroxide, the improvement which comprises intimately contacting said ethylenic compound with adsorptive alumina, having more than 30% porosity on a void-free basis attributable to pores of less than 0.030 millimeter in diameter, prior to admixing said compound with the hydrogen peroxide.

3. A process in accordance with claim 2 wherein the ethylenic compound is dissolved in a polar solvent and the resulting solution is intimately contacted with the alumina.

4. In a process of epoxidizing an ethylenic compound of 3 to 18 carbon atoms having not more than two ethylenic double bonds per molecule by reaction in the liquid phase with a peroxide oxidizing agent of the group consisting of hydrogen peroxide and peroxycarboxylic acids, the improvement which comprises intimately contacting said ethylenic compound with an adsorptive solid of the group consisting of adsorptive alumina, silica gel, magnesia gel, zirconia gel, adsorptive clay, activated carbon and animal charcoal having more than 30% porosity on a void-free basis attributable to pores of less than 0.030 millimeter in diameter, separating the thus treated ethylenic compound from the adsorptive solid, and admixing it with said peroxide oxidizing agent under epoxidizing conditions.

5. A process in accordance with claim 4 wherein the ethylenic compound is a poly-halo-ethylenic polycyclic compound which is contacted with adsorptive alumina.

6. A process in accordance with claim 5 wherein the epoxidation is carried out by reacting an aqueous alcohol solution of said ethylenic compound with hydrogen peroxide in the presence of a catalytic amount of an inorganic acid.

7. In a process of producing a halo-epoxy-octahydro-1,4,5,8-dimethanonaphthalene by reacting in the liquid phase the corresponding halo-hexahydro-1,4,5,8-dimethanonaphthalene with a peroxide oxidizing agent of the group consisting of hydrogen peroxide and peroxycarboxylic acids, the improvement which comprises intimately contacting said halo-hexahydro-dimethanonaphthalene with adsorptive alumina, having more than 30% porosity on a void-free basis attributable to pores of less than 0.030 millimeter in diameter, before admixing said peroxide oxidizing agent therewith.

8. A process in accordance with claim 7 wherein a 1,2,3,4,10,10 - hexachloro - 1,4,4a,5,6,7,8,8a - hexahydro - 1,4,5,8-dimethanonaphthalene is epoxidized by reaction with hydrogen peroxide.

9. A process of oxidizing an ethylenic compound of 3 to 18 carbon atoms having not more than two ethylenic double bonds per molecule to form a product of the group consisting of epoxidation and hydroxylation conditions which comprises passing said compound through a column of an adsorptive solid of the group consisting of adsorptive alumina, silica gel, magnesia gel, zirconia gel, adsorptive clay, activated carbon and animal charcoal having more than 30% porosity on a void-free basis attributable to pores of less than 0.030 millimeter in diameter, admixing the effluent from said column with a peroxide oxidizing agent of the group consisting of hydrogen peroxide and peroxycarboxylic acids under liquid phase oxidizing conditions at which said product is produced, and periodically washing said column with a solvent for said organic compound.

10. A process in accordance with claim 9 wherein a solution of said ethylenic compound in an alcohol is passed through a column of granular activated carbon.

11. A process in accordance with claim 9 wherein a solution of said ethylenic compound in a polar solvent is passed through an alumina column and the alumina column is periodically washed first with said polar solvent and then with a non-polar solvent for said organic compound.

12. A process in accordance with claim 10 wherein the ethylenic compound is a polyhalo-ethylenic polycyclic compound, said aqueous polar solvent is an aqueous alcohol, and said non-polar solvent is a liquid hydrocarbon.

13. A process of hydroxylating an ethylenic compound of 3 to 18 carbon atoms having not more than two ethylenic double bonds per molecule to form a product of the group consisting of epoxidation and hydroxylation conditions which comprises passing a solution of said ethylenic compound in an aqueous polar solvent through a column of adsorptive alumina solid, having more than 30% porosity on a void-free basis attributable to pores of less than 0.030 millimeter in diameter, at a temperature of about 10° C. to about 50° C. at a rate at which heavy metal ions are substantially removed from the solution, contacting the effluent from said column in the liquid phase with aqueous hydrogen peroxide under hydroxylating conditions, periodically washing said alumina with said solvent and with a non-solvent for said ethylenic compound, again passing said solution therethrough, repeating said cycle until the effectiveness of the alumina in improving the yield of hydroxylation product in said reaction with hydrogen peroxide is reduced, then treating the alumina with a solution of a strong inorganic acid, washing acid from the alumina, and further contacting ethylenic compound therewith.

References Cited in the file of this patent

UNITED STATES PATENTS

| 2,432,429 | Lecky | Dec. 9, 1947 |
|---|---|---|
| 2,444,589 | Blann | July 6, 1948 |
| 2,470,500 | Lawrence | May 17, 1949 |
| 2,613,223 | Young | Oct. 7, 1952 |
| 2,642,389 | Cohen | June 16, 1953 |
| 2,676,132 | Bluestone | Apr. 20, 1954 |
| 2,696,510 | Weedman | Dec. 7, 1954 |